United States Patent [19]
Smith et al.

[11] Patent Number: 6,080,268
[45] Date of Patent: Jun. 27, 2000

[54] ADHESIVE FOR BONDING ELASTOMERS TO METALS

[75] Inventors: Kerry C. Smith; Bhawani S. Tripathy, both of Ann Arbor, Mich.

[73] Assignee: Federal-Mogul World Wide, Inc., Southfield, Mich.

[21] Appl. No.: 09/273,916

[22] Filed: Mar. 22, 1999

Related U.S. Application Data

[63] Continuation of application No. 08/845,588, Apr. 25, 1997, Pat. No. 5,919,331.

[51] Int. Cl.[7] .................................................... C09J 183/00
[52] U.S. Cl. .............................................................. 156/326
[58] Field of Search ............................. 524/395; 156/326

[56] References Cited

U.S. PATENT DOCUMENTS

| | | |
|---|---|---|
| 3,350,345 | 10/1967 | Vanderbilt . |
| 3,969,299 | 7/1976 | Burns . |
| 4,070,224 | 1/1978 | Zemlin . |
| 4,983,699 | 1/1991 | Dana . |
| 5,169,561 | 12/1992 | Gentle . |
| 5,209,775 | 5/1993 | Bank . |
| 5,332,432 | 7/1994 | Okubi . |
| 5,376,704 | 12/1994 | Barsotti . |
| 5,421,866 | 6/1995 | Kasley . |
| 5,604,270 | 2/1997 | Klett . |
| 5,665,814 | 9/1997 | Lewis . |

FOREIGN PATENT DOCUMENTS

| | | |
|---|---|---|
| 505115 | 9/1992 | European Pat. Off. . |
| WO 96/04339 | 2/1996 | WIPO . |

OTHER PUBLICATIONS

Copy of International Search Report for PCT/US98/07802.
Derwent Publications Ltd., London, GB; AN 87–132610; XP002075743 & JP 62072775, Apr. 1987.
Material Safety Data Sheet for CHEMLOK 5150, printed Jan. 22, 1998.
Silane Coupling Agents, E.P. Plueddemann, Plenum Press, 1982, pp. 64–65.

*Primary Examiner*—Paul R. Michl
*Attorney, Agent, or Firm*—Fitch, Even, Tabin & Flannery

[57] ABSTRACT

Elastomers are securely bonded to metal substrates using an aqueous adhesive solution containing a silane adhesive in combination with a phosphonium quaternary salt additive. The additive concentration is preferably between 15% and 40% of the silane concentration. The concentration of the silane and additive in the water base is preferably 2.7%, on a weight basis.

10 Claims, No Drawings

ADHESIVE FOR BONDING ELASTOMERS TO METALS

This is a continuation of prior application Ser. No. 08/845,588, filed Apr. 25, 1997, now U.S. Pat. No. 5,919,331.

BACKGROUND OF THE INVENTION

1. Field of the Invention

The present invention relates to aqueous solutions of silane-based adhesives used to bond elastomers to metals and elastomers to plastics and relates particularly to the adhesive bonding of elastomeric shaft seals to annular metal mounting elements without using adhesives containing organic solvents.

2. Description of Prior Developments

A common liquid adhesive for bonding elastomers to metal in the production of shaft seals is available in the form of silane dispersed in a volatile organic solvent. The emission of organic solvents such as methanol into the atmosphere as an incident to the bonding operation is considered to pose health and environmental risks. It is therefore desirable to avoid the use of volatile organic solvents while maintaining a strong adhesive bond between an elastomer and its substrate.

SUMMARY OF THE INVENTION

The present invention is concerned with an adhesive dispersed in water rather than in an organic solvent so as to eliminate organic solvent emissions which can pose health and environmental risks. A principal object of the invention is to provide an aqueous adhesive solution having adhesive bonding properties equivalent to the bonding properties of known organic solvent-based silane adhesives of the type used to bond elastomeric sealing members to their metal casings. The elastomers include polyacrylic, ethylene acrylic, nitrile, fluoroelastomers, and tetrafluoroethylene-propylene materials.

A principal feature of the invention is the use of a silane adhesive in combination with a phosphonium or ammonium quaternary salt additive in a dilute aqueous solution. The additive is believed to act as a surfactant and a silane structure modifier, whereby the silane adhesive is enabled to more easily wet the surfaces of small radius areas and narrow openings on the metal substrate and develop a more compliant bond. The effect is to achieve a more extensive bond, free from blisters, potmarks and other bond defects that can lead to high scrap rates. The preferred additive material is benzyl triphenyl phosphonium chloride, sometimes referred to as "BTPPC" and symbolized as:

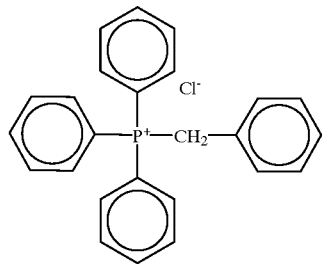

Other halogen salts of this compound, i.e. bromide and iodide, will also work effectively. Other quaternary salts, such as alkyl, aryl, or alkyl-aryl salts of phosphonium and ammonium will also work effectively.

DETAILED DESCRIPTION OF THE PREFERRED EMBODIMENTS

An adhesive formulated in accordance with the present invention is used to bond an elastomeric seal, such as an annular radial lip shaft seal to a metal carrier or substrate. The adhesive preferably includes an aqueous solution containing a silane adhesive and an additive selected from the group consisting of an aryl phosphonium quaternary salt, an alkyl phosphonium quaternary salt, an aryl ammonium quaternary salt, an alkyl ammonium quaternary salt, an aryl-alkyl phosphonium quaternary salt, and an aryl-alkyl ammonium quaternary salt, the concentration of the additive being at least 15% of the silane concentration, on a weight basis. A preferred additive is BTPPC.

Other possible adhesive formulations include an aqueous solution containing a silane adhesive and an additive selected from the group consisting of an aryl ammonium quaternary salt, an alkyl ammonium quaternary salt, and an aryl-alkyl ammonium quaternary salt, the concentration of the additive being at least 15% of the silane concentration, on a weight basis.

Other formulations include an aqueous solution containing a silane adhesive and an additive selected from the group consisting of an aryl phosphonium quaternary salt, an alkyl phosphonium quaternary salt, and an aryl-alkyl phosphonium quaternary salt, the concentration of the additive being at least 15% of the silane concentration, on a weight basis.

When BTPPC is selected as the additive, the recommended concentration of BTPPC in a virgin silane adhesive is 33% by weight of the silane content. This generates optimum properties of the adhesive from bond strength and storage stability considerations. The BTPPC will work at concentrations as low as 15% by weight of the silane content, however, the bond properties of the adhesive will improve with an increase in concentration in BTPPC. The upper limit is set by the degree of solubility of the BTPPC in water. However, concentrations higher than 33% by weight of the silane content tend to make the adhesive more temperature sensitive and less stable, thus reducing its life.

For additive compounds other than BTPPC, such as those mentioned above, the additive concentration is determined based on the degree of solubility in water, temperature sensitivity, stability, and stoichiometric equivalence (in mole percent) of the concentration specified for BTPPC.

The BTPPC should be mixed in water prior to mixing with a virgin silane adhesive. This solution of the BTPPC in water is referred to as a premix. The correct amount should be calculated based on the silane content of the virgin adhesive and the final percent solid desired. The calculation should take into account the amount of extra water that is added as a result of adding the BTPPC in a solution form.

EXAMPLE

If the final solid content of 10% is desired, and if the silane content of the virgin adhesive is 16%,
    the silane content of final adhesive=7.52%
    the BTPPC content of final adhesive=2.48% (33% of the silane content).
100 grams of virgin adhesive contains 16 grams of silane. This 16 grams of silane should be in a total weight of 212.8 grams of adhesive to result in a 7.52% silane content. Thus, the weight of the premix (BTPPC/water solution) to be added equals 112.8 grams.

The optimum BTPPC weight (33%) for 16 grams of silane is 5.3 grams. Therefore, the premix should contain 5.3 grams of BTPPC and 107.5 grams of water.

To summarize the mixing calculations, for every 100 grams of virgin adhesive at 16% silane content, 5.3 grams of the BTPPC is added to 107.5 grams of water to prepare the premix, and then the premix is added into the virgin adhesive. This produces 212.8 grams of final adhesive at 10% solid.

For preparation of the BTPPC/water premix, the BTPPC should be added gradually to avoid caking. Slow agitation while mixing will also help to avoid caking. For the concentration specified above, preparing the premix will not be a problem. However, if a higher percent solid of the final product is desired, more careful mixing should be followed. Heating the mixture to 50–60° C. will also help in getting the BTPPC into solution in water.

For mixing the premix into the virgin adhesive, care should be taken to see that the premix is at room temperature. Mixing should be done gradually and with very gentle agitation. Care should be taken not to exceed the temperature of 28° C. for the product.

The adhesive should be diluted for use in production. The recommended percent solid of the adhesive in the production bath is 2.7%. The concentration should be adjusted if the solids content goes beyond 2–4% range.

The adhesive can be applied either by a dipping process or a spray application process. The temperature of the dilute adhesive should be maintained below 32° C. at all times for long shelf life. If required, a cooling system should be installed. Slight precipitation of the adhesive is expected during normal operation. Recirculation of the adhesive in the bath can be used to extend the life. A filter can also be used in conjunction with recirculation to keep the adhesive clean. The percent solid and concentration of the additive should be continuously monitored and adjusted if necessary.

Addition of BTPPC to the virgin adhesive makes it more temperature sensitive. The temperature of the adhesive during transit and storage should not exceed 30° C. The adhesive should not be allowed to freeze at any time. The recommended shelf life of the adhesive in an unopened container is about 6 months at 28° C.

The stability of the adhesive in the dilute form during use depends on the conditions of operation. Generally speaking, the adhesive should be used as long as no visible precipitates are observed in the bath and all bath control parameters are within limits. If the bath is maintained at less than 28° C., a life of several months should be expected.

In the manufacture of an elastomeric seal, such as a shaft seal, the metal seal carrier or other metal part is coated with the aqueous adhesive solution, at least on the metal area that is to be bonded to the elastomer. Prior to the adhesive coating operation, the metal part is preferably phosphate-coated to produce a more adherent surface. The adhesive coating operation can be performed by a dipping or spraying process at room temperature. When dipping is used, a barrel containing a number of metal parts can be lowered into a tank containing the aqueous adhesive solution. The barrel can be lifted out of the tank and held over the tank for a predetermined time period, e.g., sixty seconds, to allow excess adhesive solution to drain into the tank.

The adhesive-coated metal part is oven-dried at a temperature of about 160° F. for a period of about eight minutes. The coated metal part and associated elastomer are then placed in a mold or press having a cavity configured to exert pressure on the external contours on the elastomer and metal part.

As the mold is closed, the elastomer is pressurized while the heated metal part exerts a curing action on the dried adhesive coating. The adhesive forms a bond between the elastomer and metal part. After a pressurized cure time of about two to six minutes, depending on the type of elastomer, the mold is opened and the bonded assembly is removed to complete the process.

The preferred adhesive comprises an aqueous or water solution containing a silane adhesive and an additive material, benzyltriphenyl phosphonium chloride, i.e. BTPPC. The combined concentration of the silane and the additive in the aqueous solution, on a weight basis, is preferably in the range of 2.0 to 4.0%. The optimum concentration is slightly less than 3.0%, e.g. 2.7%. At higher concentrations greater than 4.0%, the adhesive shelf life is adversely affected.

In a preferred practice of the invention, the concentration of the BTPPC additive is between 15% and 40% of the silane concentration, on a weight basis. Below a fifteen percent concentration, the BTPPC is generally ineffective. Above the 33% concentration, the BTPPC additive tends to precipitate out of solution. The preferred relative quantity ratio of BTPPC to silane is approximately 33%, which gives optimum bond strength and shelf life.

Comparative tests were run using an aqueous adhesive solution containing silane and BTPPC in a combined preferred concentration of about 2.7%, versus an aqueous adhesive solution containing only silane in a concentration of about 2%. Both adhesive solutions contained substantially equal silane concentrations. Thixon W-3970, an aqueous amino-propyl-vinyl silane adhesive manufactured by Morton International Inc., was used as the virgin adhesive. To this adhesive solution which contained 16% silane, by weight, different quantities of BTPPC ranging from 2.4 grams to 6.4 grams per 100 grams of adhesive was added. The preferred concentration of BTPPC is 5.28 grams per 100 gram of Thixon W-3970. The adhesive solution with the additive was diluted to get 2.7% combined silane and BTPPC concentration.

Using the aqueous adhesive solution containing only silane, the bond related scrap rate on approximately 2800 sample parts was about 0.31%. Using an aqueous adhesive solution containing silane and BTPPC additive, the bond related scrap rate on approximately 525 sample parts was 0.0%, i.e. no bond defects. The test results were run on a range of different elastomers. The use of BTPPC additive with silane adhesive in an aqueous solution is believed to produce an improved adhesive action on a variety of different elastomers. The use of a single adhesive solution with a range of different elastomers is an advantage in a production atmosphere where more than one metal-elastomer combination may be produced at a single production facility.

Obviously, numerous modifications and variations of the present invention are possible in the light of the above teachings. It is therefore to be understood that within the scope of the appended claims, the invention may be practiced otherwise than as specifically described herein.

What is claimed is:

1. A liquid adhesive composition comprising:
   water;
   a silane adhesive; and
   a quaternary salt selected from the group consisting of an alkyl quaternary phosphonium salt, an aryl quaternary phosphonium salt, an alkyl-aryl quaternary phosphonium salt, an alkyl quaternary ammonium salt, an aryl quaternary ammonium salt, an alkyl-aryl quaternary ammonium salt and mixtures thereof, the silane being miscible with water in the presence of the quaternary salt, wherein the quaternary salt is present in the range of from about 15 to about 40 weight percent, based upon the weight of the silane adhesive, and the silane adhesive and the quaternary salt comprise from about 2 to about 4 weight percent of the liquid adhesive composition, the liquid adhesive being substantially without visual precipitates.

2. The liquid adhesive composition as recited in claim 1 wherein the quaternary salt is selected from the group consisting of an alkyl quaternary ammonium salt, an aryl quaternary ammonium salt, an alkyl-aryl quaternary ammonium salt and mixtures thereof.

3. The liquid adhesive composition as recited in claim 1 wherein the quaternary salt is selected from the group consisting of an alkyl quaternary phosphonium salt, an aryl quaternary phosphonium salt, an alkyl-aryl quaternary phosphonium salt and mixtures thereof.

4. The liquid adhesive composition as recited in claims 1, 2 or 3, wherein the liquid adhesive composition is substantially free of organic solvent.

5. An aqueous liquid adhesive composition which is substantially free of organic solvent, the liquid adhesive composition comprising
    water;
    a silane adhesive; and
    a quaternary salt having the formula

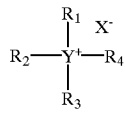

wherein Y=N or P
    X=Cl, Br or I
    $R_1, R_2, R_3$ or $R_4$=alkyl or aryl, wherein the quaternary salt is present in the range of from about 15 to about 40 weight percent, based upon the weight of the silane adhesive, and the silane adhesive and the quaternary salt comprise from about 2 to about 4 weight percent of the liquid adhesive composition, the silane being miscible with water in the presence of the quaternary salt, and the aqueous liquid adhesive composition being substantially without visual precipitates.

6. An aqueous composition as recited in claim 5 where in Y=N.

7. An aqueous composition as recited in claim 5, wherein Y=P.

8. An aqueous composition as recited in claim 7, wherein the quaternary salt is benzyl triphenyl phosphonium chloride.

9. A liquid adhesive composition which is substantially free of organic solvent, the composition comprising:
    water;
    a silane adhesive; and
    a quaternary salt selected from the group consisting of an alkyl quaternary phosphonium salt, an aryl quaternary phosphonium salt, an alkyl-aryl quaternary phosphonium salt, an alkyl quaternary ammonium salt, an aryl quaternary ammonium salt, an alkyl-aryl quaternary ammonium salt and mixtures thereof, the silane being miscible with water in the presence of the quaternary salt,
    wherein the quaternary salt is present in the range of from about 15 to about 40 weight percent, based upon the weight of the silane adhesive, and the silane adhesive and the quaternary salt comprise from about 2 to about 4 weight percent of the liquid adhesive composition, the liquid adhesive being substantially without visual precipitates.

10. The liquid adhesive of claim 1, wherein the quaternary salt is benzyl triphenyl phosphonium chloride.

* * * * *